Figure 1:
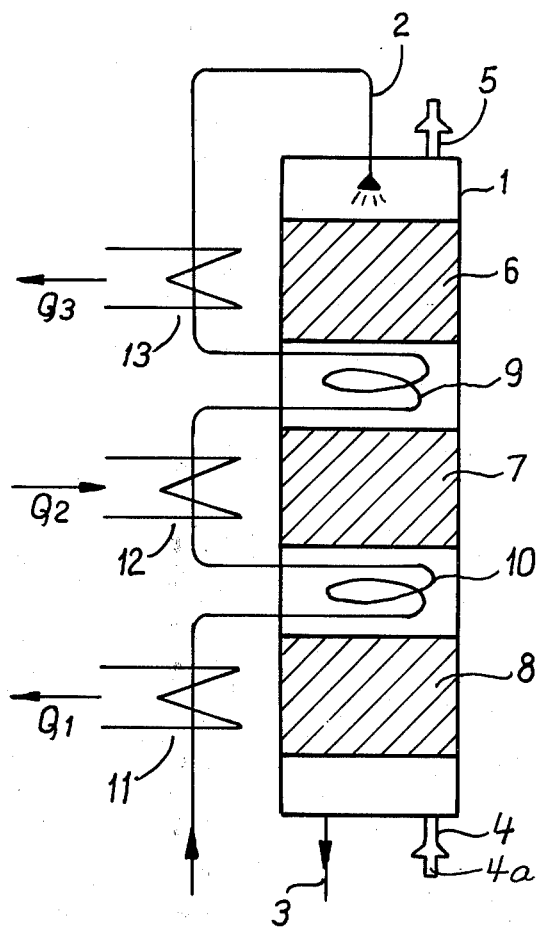

United States Patent [19]

Jernqvist

[11] 4,177,044
[45] Dec. 4, 1979

[54] PROCESS FOR REMOVING OXYGEN FROM AND ADDING CARBON DIOXIDE TO A LIQUID WATER

[75] Inventor: Åke S. Jernqvist, Lund, Sweden

[73] Assignee: Alfa-Laval AB, Tumba, Switzerland

[21] Appl. No.: 829,951

[22] Filed: Sep. 1, 1977

[30] Foreign Application Priority Data

Sep. 6, 1976 [SE] Sweden .................................. 7609798

[51] Int. Cl.² .............................................. B01D 19/00
[52] U.S. Cl. ......................................... 55/48; 55/49; 55/68; 55/53; 261/148; 261/149
[58] Field of Search .................. 55/39, 42, 49, 51, 68, 55/48, 53; 261/DIG. 7, 148, 149

[56] References Cited

U.S. PATENT DOCUMENTS

| | | | |
|---|---|---|---|
| 2,527,659 | 10/1950 | Smith | 261/DIG. 7 |
| 3,233,388 | 2/1966 | Karwat et al. | 55/49 |
| 4,070,231 | 1/1978 | Alleman | 55/32 |

FOREIGN PATENT DOCUMENTS 562184  11/1957  Belgium ........................................ 55/31

*Primary Examiner*—Bernard Nozick
*Attorney, Agent, or Firm*—Cyrus S. Hapgood

[57] ABSTRACT

A liquid and a carbon dioxide containing gas are brought into intimate contact with each other while flowing countercurrently through a column divided into three contact zones. The liquid flows through the first contact zone at a relatively low temperature $t_1$ to take up carbon dioxide from the gas, then through the second contact zone for delivering carbon dioxide and oxygen to said gas at a higher temperature $t_2$, and finally through the third contact zone to take up carbon dioxide at a lower temperature $t_3$ with respect to the temperature $t_2$.

2 Claims, 2 Drawing Figures

PROCESS FOR REMOVING OXYGEN FROM AND ADDING CARBON DIOXIDE TO A LIQUID WATER

The present invention relates to a process for removing oxygen from and adding carbon dioxide to a liquid, preferably water, and in which the liquid and a carbon dioxide-containing gas are brought into intimate contact during counter-current flow.

In the brewery and soft drink industries, process water is required which contains a very low amount of dissolved oxygen at low temperature. The water must also be completely or partly saturated with carbon dioxide at this temperature. A further demand may be that the water is pasteurized, i.e., that it shall have been heated to 70°–90° C. before the use in the continued manufacturing process.

In order to deaerate such process water, an apparatus has been used which consists of containers maintained under vacuum and into which water is injected at 50° C. and discharged at 40° C., for example. The discharged deaerated water is cooled and treated in a special plant with carbon dioxide. Suitably, the pasteurization is carried out before this treatment. With the arrangement described, the desired low oxygen content of 0.1 mg $O_2$/liter is not reached. Therefore, there has been research for methods for simple and economical manufacturing of pasteurized water having said low oxygen content, the water being completely or partly saturated with carbon dioxide at low temperature. These attempts have hitherto not been successful. It is well known per se to arrange counter-current flow between a liquid and a gas, such as carbon dioxide, in so-called columns provided with means for achieving intimate contact between a gas and a liquid in order to dissolve the gas in the liquid. By this arrangement, however, a low oxygen content is not achieved in an economical way.

The principal object of the present invention, therefore, is to provide a process of the first-mentioned kind by which process water with a very low content of dissolved oxygen, i.e., less than 0.1 mg/liter at 5° C., can be prepared in an economical way, the water being completely or partly saturated with carbon dioxide at this temperature. Pasteurization of the process water, if required, can also be included in the process.

According to the invention, a process of the first-mentioned kind is characterized in that the liquid essentially for carbon dioxide take-up is forced to flow through a first contact zone at a relatively low temperature $t_1$, then through a second contact zone for delivering carbon dioxide and oxygen at higher temperature $t_2$, and finally through a third contact zone essentially for carbon dioxide take-up at a lower temperature $t_3$ with respect to the temperature $t_2$.

According to a preferred embodiment of the invention, the liquid is forced to flow through the first contact zone at the temperature $t_1 = 5°–30°$ C., through the second contact zone at the temperature $t_2 = 30°–90°$ C. and finally through the third contact zone at the temperature $t_3 = 0°–30°$ C.

An apparatus for carrying out the process according to the invention comprises at least one container internally provided with means for achieving intimate contact between gas and liquid and provided with such inlets and outlets for liquid and gas that counter-current flow is obtained between the gas and the liquid. With respect to the liquid inlet, the apparatus is divided into a first, a second and a third contact zone, devices being provided for the addition of liquid at the relatively low temperature $t_1$, first means being provided for heating the liquid flowing from the first to the second contact zone, and second means being provided for cooling the liquid flowing from the second to the third contact zone.

According to a first embodiment of the apparatus, wherein the container consists of a vertical column, said first and second means consist of a first and a second heat exchanger arranged between the first and the second contact zones and between the second and the third contact zones, respectively. Conveniently, the liquid fed to the apparatus is cooled in a heat exchanger arranged outside the apparatus.

In a preferred form of this first embodiment, the first and the second heat exchangers consist of spiral heat exchangers, i.e., heat exchangers having a long flat channel for one medium, the channel having been wound to a spiral around an axis perpendicular to the direction of the channel, so that a channel with a spiral-formed section is formed for the second medium.

In a further form of the first embodiment, the second heat exchanger is arranged to be cooled with cooled process liquid being fed to the apparatus, whereas a third heat exchanger is arranged to heat the cooling liquid coming from the second heat exchanger, the first heat exchanger is arranged to be heated with heated liquid coming from the third heat exchanger, and a fourth heat exchanger is arranged to cool heating liquid coming from the first heat exchanger, the last mentioned liquid then being added to the first contact zone of the apparatus.

According to a second embodiment of the apparatus for carrying out the process of the invention, wherein the container consists of a vertical column, said column is provided with a first liquid-collecting outlet and a liquid-distributing outlet between the first and the second contact zones and is provided with a second liquid-collecting outlet and liquid-distributing inlet between the second and the third contact zones, a first heat exchanger being connected to the first outlet and inlet in such a way that it heats the liquid flowing from the first to the second contact zone, and a second heat exchanger being connected to the second outlet and the second inlet in such a way that it cools the liquid flowing from the second to the third contact zone.

Since pasteurization of the liquid (i.e., generally process water) is conveniently carried out in the first heat exchanger, carbon dioxide can be separated from the liquid in gaseous form in said heat exchanger if special measures are not taken. To avoid this disadvantage, a further form of the second embodiment of the apparatus includes a restriction (such as that provided by a valve) arranged between the first heat exchanger and the first liquid distributing inlet to achieve a higher pressure in the first heat exchanger than in the container, so that carbon dioxide gas formation is prevented in the first heat exchanger.

Figure 2:
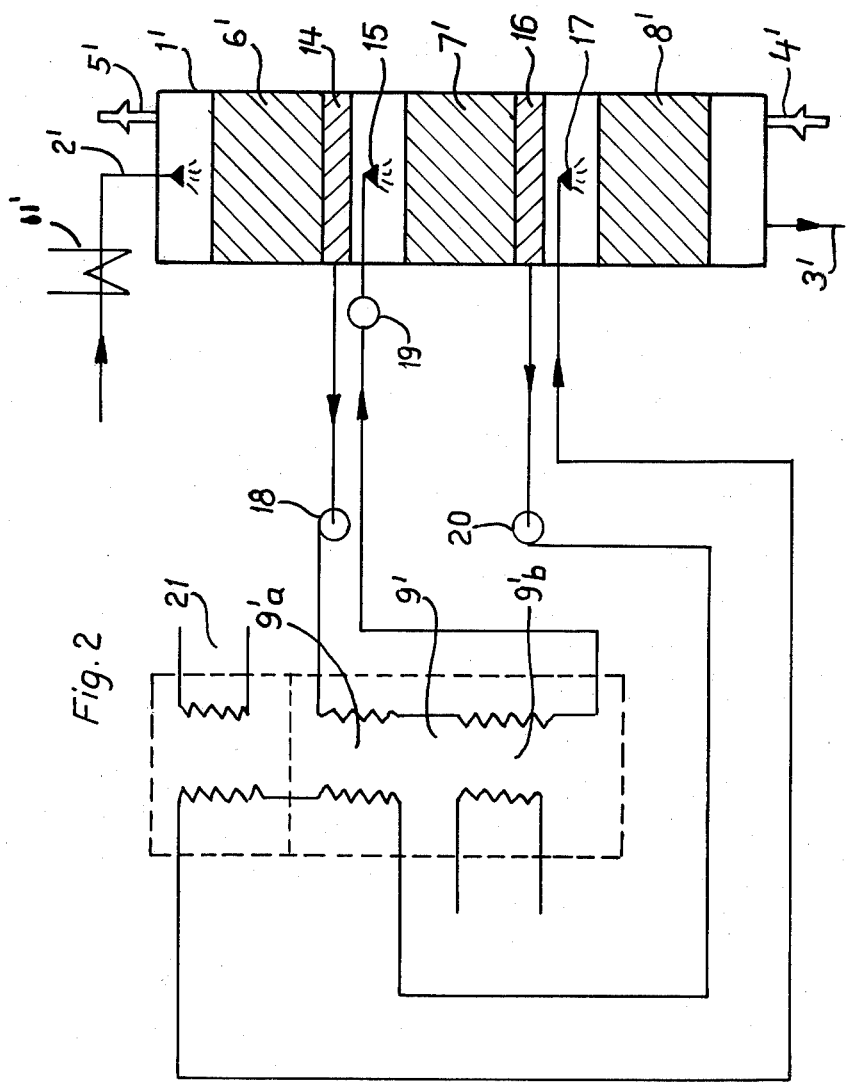

The two embodiments of an apparatus for carrying out the process and mentioned above as examples will now be described in detail with reference to the accompanying drawings, in which FIG. 1 is a schematic view of the first embodiment and FIG. 2 is a similar view of the second embodiment.

In FIG. 1, the reference numeral 1 designates a column provided with a liquid inlet 2, a liquid outlet 3, a gas inlet 4 and a gas outlet 5. The column 1 is divided into upper, intermediate and lower contact zones 6, 7 and 8, respectively. These contact zones can consist of filling members, which members are used in many different variations, such as tube pieces, saddle-formed pieces, etc. The contact zones can also consist of so-called bubble cap plates, which are well-known in the field of chemical engineering, or other kinds of column plate members. The filling members as well as the column plate members have the common purpose of forcing the liquid and the gas in intimate contact with each other.

Mounted in the intermediate space between the contact zones 6 and 7 is a heat exchanger 9, preferably a spiral heat exchanger with the spiral-wound flat channel standing upright; and in the intermediate space between the contact zones 7 and 8 is a heat exchanger 10 which also is preferably a spiral heat exchanger mounted in the same way. Outside the column 1, three heat exchangers 11, 12 and 13 are arranged.

The liquid to be treated, in this case the process water, is passed through the heat exchanger 11 where it is cooled, as indicated by an arrow $Q_1$, and then flows to the heat exchanger 10 for cooling the latter and heating itself. The heated process water is then passed to the heat exchanger 12 to be further heated therein, as indicated by an arrow $Q_2$. The process water then flows to the heat exchanger 9 to heat the same and is passed somewhat cooled-down to the heat exchanger 13 to be further cooled to a desired first relatively low temperature $t_1$, the cooled liquid from exchanger 13 being sprayed into the column 1 through inlet 2. The process water then descends through column 1 while meeting carbon dioxide or a gas containing carbon dioxide, which gas is fed from source 4a through the inlet 4 and (in less amount) is discharged through outlet 5. The process water after passing through the first contact zone 6 and heat exchanger 9 has a relatively high temperature $t_2$; and after it has passed through the second contact zone 7 and the heat exchanger 10, the process water has a relatively low temperature $t_3$.

In the first contact zone 6, the water at the prevailing temperature dissolves carbon dioxide, and oxygen is transmitted to the carbon dioxide flow. In the second contact zone 7, where the liquid temperature is higher, carbon dioxide tends to be released from the liquid, which facilitates the transmission of oxygen to the gas flowing through the column. The released amount of carbon dioxide then rises in the column and is once again dissolved in down-flowing liquid, etc., so that carbon dioxide will be flowing in an oxygen-extracting circuit. In the third contact zone 8, carbon dioxide is then dissolved in the cooled liquid and the latter leaves the column with a very low concentration of dissolved oxygen.

In the second embodiment shown in FIG. 2, a column 1' is provided with liquid inlet 2', a liquid outlet 3', a gas inlet 4' and a gas outlet 5'. The column 1' is divided into three contact zones 6', 7' and 8', starting at the top. These contact zones can be of the same kind as those already described with respect to the first embodiment. The heat exchanger 11' is arranged to cool the liquid fed to the column to the desired relatively low temperature $t_1$ °C.

In this embodiment, a liquid-collecting outlet 14, which may be in the form of a column plate, is arranged between the first and second contact zones 6' and 7'. Below this outlet, a liquid-distributing inlet 15 is arranged. In the same way, a liquid-collecting outlet 16 and a liquid-distributing inlet 17 are arranged between the second and the third contact zones 7' and 8'. No heat exchangers are present within the column 1'. Instead, a pump 18 is arranged to pump the liquid from the first contact zone 6' through heat exchanger 9' from which the heated liquid is fed to the second contact zone 7' via a flow restricter 19 (such as a valve) and the distributing inlet 15; and the liquid coming from the second contact zone 7' is delivered by a pump 20 to a heat exchanger 21, in which the liquid is cooled before being introduced into the third contact zone 8' through the inlet 17. Advantageously, the heat exchangers are so arranged that the liquid from the first contact zone 6' is first heated in a section 9'a of the heat exchanger 9' by heat exchange with the liquid coming from the second contact zone 7', the latter liquid thereby being somewhat cooled. The liquid from the first contact zone 6' is then further indirectly heated in the section 9'b by means of steam. The liquid coming from the contact zone 7', after having passed through the section 9'a, is further cooled in the heat exchanger 21 (which can be combined with the heat exchanger 9') to the desired relatively low temperature $t_3$ °C. It will be understood that the flow restriction 19 maintains a higher pressure in the first heat exchanger 9' than the pressure in column 1', thereby avoiding formation of $CO_2$ gas in exchanger 9'. The apparatus according to this second embodiment works similarly to that of the first embodiment. Leaving out the disclosed design differences between the use of internal heat exchangers and external heat exchangers, the second embodiment offers a direct possibility of pasteurizing the process liquid before it is introduced into the second contact zone.

Within the scope of the invention, the apparatus for carrying out the process can be designed in many ways. For example, it is suitable to arrange recirculation of the $CO_2$-containing gas leaving the container 1 or 1' (usually a column) to the gas inlet or to an inlet arranged between some of the contact zones, preferably between the second and the third contact zones. The purpose is to achieve a sufficient gas flow through the container without jeopardizing the process economy. That means, of course, that some gas must be continuously discharged from the gas circulation circuit so that the oxygen content in the gas will not be so high that the desired low concentration of dissolved oxygen in the liquid cannot be reached.

As an example of performance data for the process according to the invention, the following is data obtained from the system according to FIG. 2, in which gas circulation from the gas outlet 5' to the gas inlet 4' has been arranged.

The column 1' has a diameter of 0.5 m and the contact zones 6', 7' and 8' are each filled up to a height of 1.0 m with commercially available saddle filling members with the characteristic dimension 25 mm.

5 m³/h of water at the temperature $t_1 = 10°$ C. is introduced in the top of the column, and 30 kg/h of carbon dioxide at the pressure 1 atm. is introduced at the lower part of the column. 15 kg/h of $CO_2$ is absorbed by the liquid, which leaves at the temperature $t_3 = 4°$ C. and with an oxygen content <0.1 mg/liter. By circulating carbon dioxide from the gas outlet 5' to the gas inlet 4', totally 45 kg/h of $CO_2$ flow in through the latter. From the gas circulation circuit, 15 kg/h of $CO_2$ are continuously removed. The liquid is pasteurized in the external heat exchanger 9' and is introduced into the column through the liquid distributing inlet 15 at the temperature $t_2 = 77°$ C.

I claim:

1. A process for removing oxygen from and adding carbon dioxide to a liquid, such as water, wherein the liquid and a carbon dioxide containing gas are brought into intimate contact with each other during countercurrent flow thereof, the process being characterized in that the liquid is caused to flow through a first contact zone at a relatively low temperature $t_1$ to take up carbon dioxide, then through a second contact zone for delivering carbon dioxide and oxygen to said gas at a higher temperature $t_2$, and finally through a third contact zone to take up carbon dioxide at a lower temperature $t_3$ with respect to the temperature $t_2$.

2. The process of claim 1, in which the liquid flows through the first contact zone at a temperature $t_1$ of 5°–30° C., through the second contact zone at a temperature $t_2$ of 30°–90° C. and finally through the third contact zone at a temperature $t_3$ of 0°–30° C.